United States Patent Office 3,509,453
Patented Apr. 28, 1970

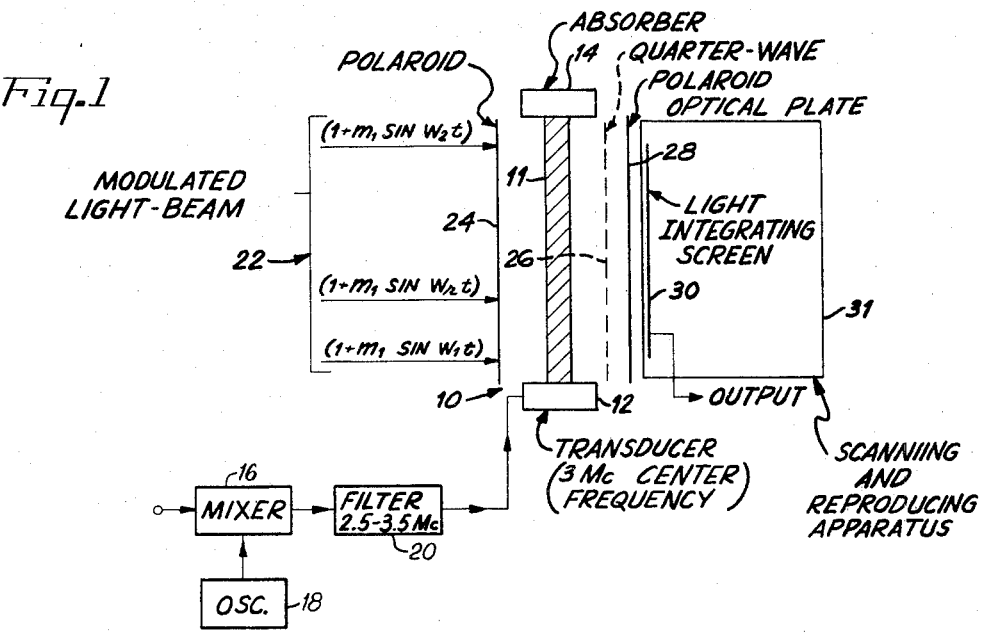
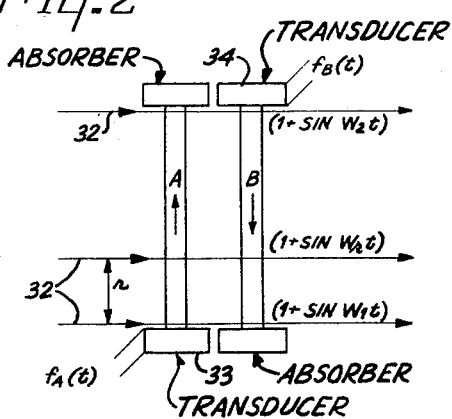
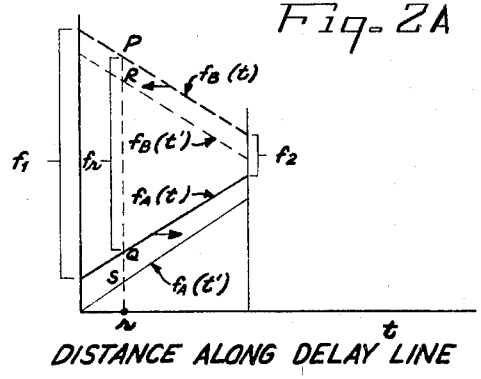
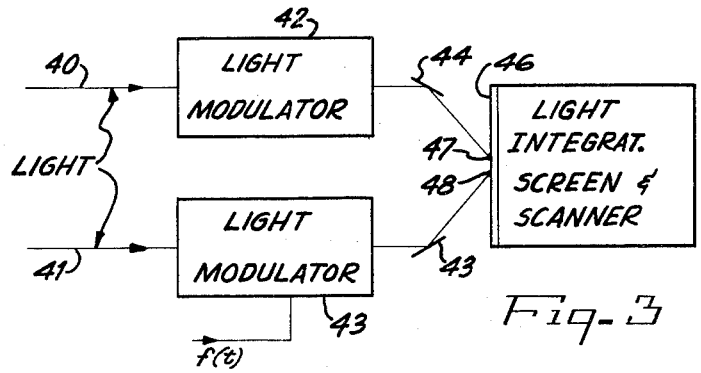

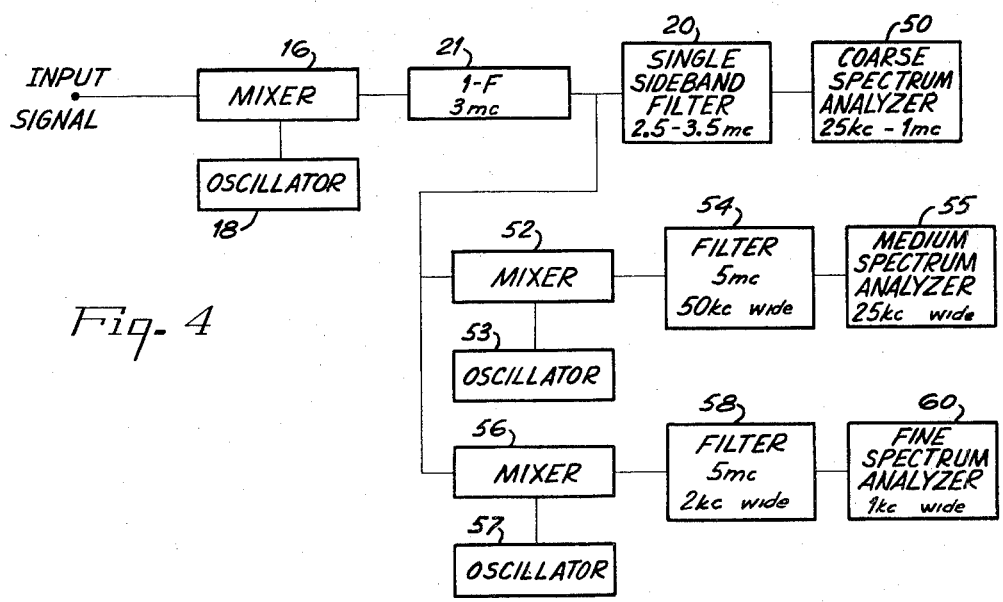
Fig. 4
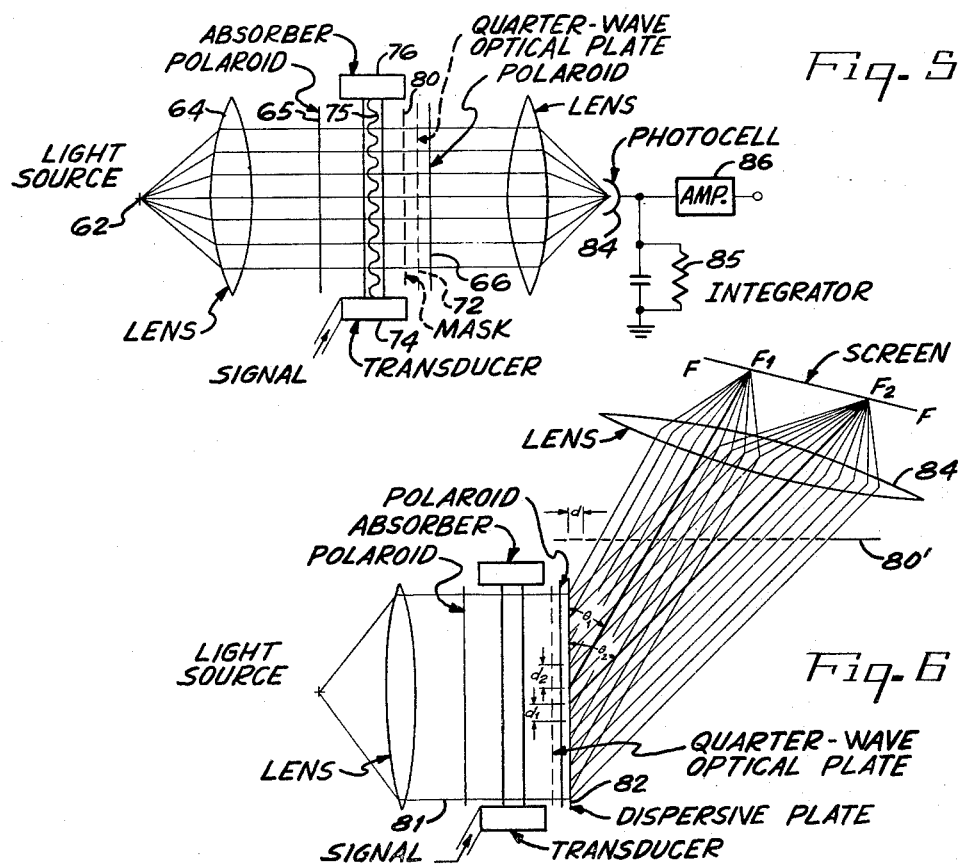
Fig. 5
Fig. 6

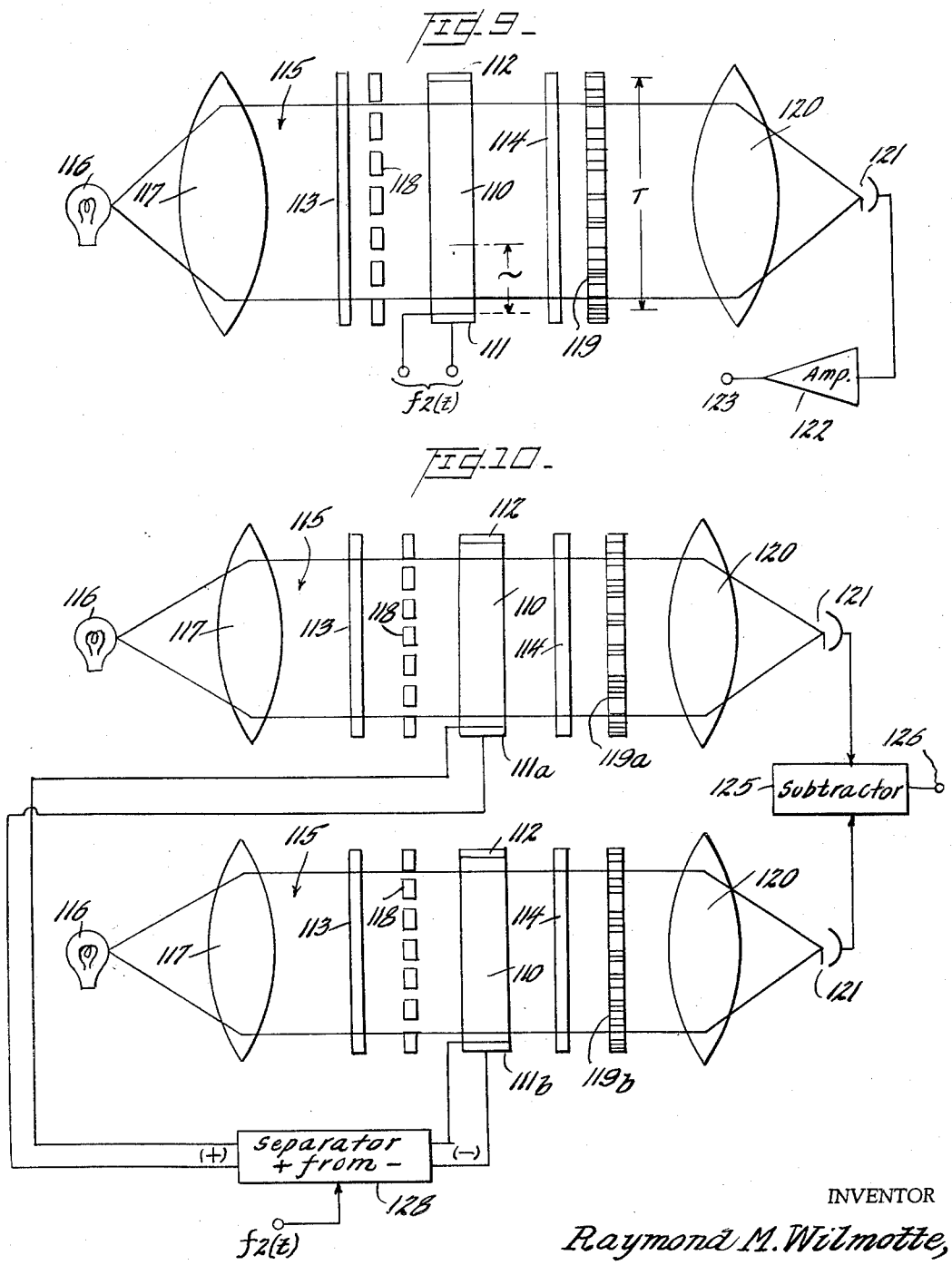

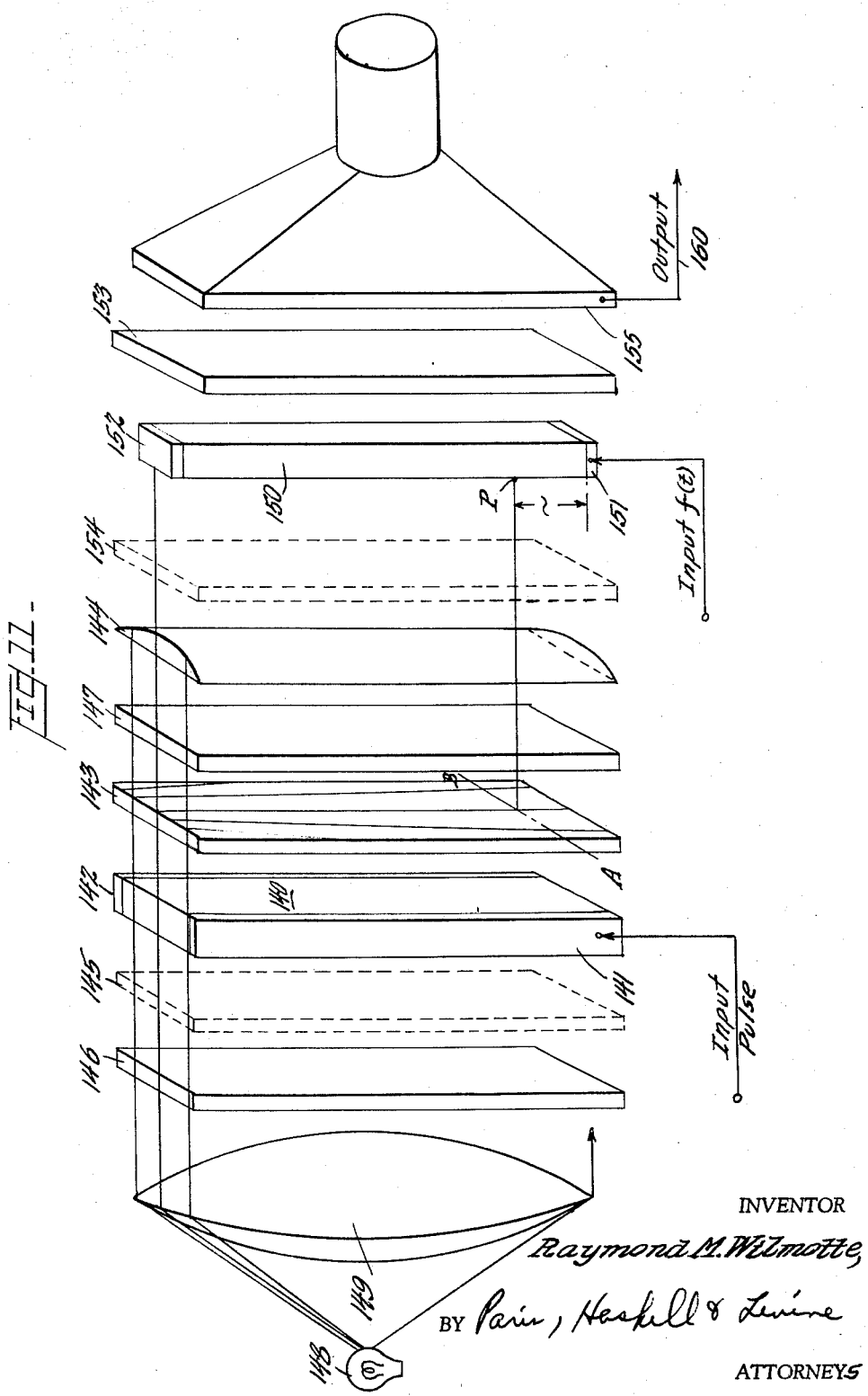

3,509,453
LIGHT MODULATION SYSTEM FOR
ANALYSIS OF INFORMATION
Raymond M. Wilmotte, 68 Mountain Ave.,
Princeton, N.J. 08540
Continuation-in-part of applications Ser. No. 734,728,
May 12, 1958, and Ser. No. 835,648, Aug. 24,
1959. This application Nov. 21, 1961, Ser. No.
158,928
Int. Cl. G01r 23/16, 27/02
U.S. Cl. 324—77                          35 Claims The present case is a continuation-in-part of both my copending applications Ser. No. 734,728, filed May 12, 1958, now abandoned, entitled Instantaneous and Continuous Spectrum Analyzer; and Ser. No. 835,648, filed Aug. 24, 1959, now abandoned, entitled Cross-Correlator, and combines the entire teachings and claims of both these applications.

The present invention relates to apparatus for determining the frequency components of an electrical signal, and particularly to a spectrum analyzer and signal correlator, capable of giving an instantaneous and continuous indication of the frequency components of a signal within a given frequency band, or the correlation function of a signal with a predetermined waveform.

It is an object of the invention to provide a spectrum analyzer capable of giving substantially instantaneous indication of the frequency components of a signal and the relative magnitude of these components.

It is another object of the invention to provide a spectrum analyzer for electrical waves capable of giving a continuous spectrum throughout a rather broad frequency range.

It is another object of the invention to analyze and indicate the frequencies of the spectrum of a signal simultaneously.

It is still another object of the invention to provide a spectrum analyzer having very high frequency resolution.

It is still another object of the invention to provide a spectrum analyzer which is very rugged and is not sensitive to temperature variations over a wide range.

Another object of the invention is to provide a spectrum analyzer which is capable simultaneously of covering a broad frequency band and also providing an intermediate and a fine frequency resolution over narrower selected portions of the frequency band.

It is a further object of the present invention to provide for the production of a correlation function.

Another object of the present invention is to provide for the production of a correlation function in the time domain.

Another object of the present invention is to provide for the production of a correlation function in the time domain, which includes the fine structure of the correlation function, as well as the envelope.

Still another object of the present invention is to provide a very accurate matched filter for any desired waveform.

And still another object of the present invention is to provide such a filter utilizing an optical mask as the selective device.

The above and other objects and advantages of the invention will become apparent and the invention itself will be fully understood from the following description and the drawings in which:

FIG. 1 is a schematic diagram of a spectrum analyzer according to the invention;

FIG. 2 is a schematic diagram of a light modulator adapted to be used as a light source in the spectrum analyzer of FIG. 1;

FIG. 2A is a diagram illustrating the operation of the light modulator of FIG. 2;

FIG. 3 is a schematic diagram of a modification of the apparatus shown in FIG. 1;

FIG. 4 is a block diagram of a spectrum analyzer for providing course, medium and fine spectra;

FIG. 5 is a schematic view of an arrangement for determining and obtaining a frequency component of a very narrow band of frequency components of an input signal;

FIG. 6 is a diagrammatic view of a spectrum analyzer embodying the principles of the apparatus illustrated in FIG. 5;

FIG. 9 is a schematic illustration of a modification of the embodiment of the invention shown in FIG. 5;

FIG. 10 is a schematic illustration of a modification of the embodiment of the invention shown in FIG. 9; and FIG. 11 is a schematic illustration of a modification of the embodiment of the invention shown in FIGS. 1 and 2.

Figure 6A:
FIG. 6A is a detailed view in cross section of a dispersion plate used in the apparatus of FIG. 6.

The technique utilized in the present invention is the transmission of an electrical signal through a transparent, solid, bi-refractive delay line in the form of an ultrasonic wave. The stresses produced by the ultrasonic wave in the solid material of the delay line cause it to become bi-refractive. By using crossed Polaroids and a quarter wave optical plate with appropriate orientations, the bi-refractive characteristic of the delay line is translated into modulations of the intensity of an output light beam, proportionately to the variations of the stress, and consequently in accordance with the waveform of the electrical signal.

Referring to FIG. 1 of the drawing, there is shown a light modulator 10 comprising a transparent delay line 11. The delay line includes an elongated member or a rod of material having a low attenuation for ultrasonic waves, such as fused quartz. At one end of the delay line an electroacoustic transducer 12 is provided and at the other end of the delay line an acoustic wave absorber 14 is mounted so as to completely absorb the sonic waves reaching that end of the delay line. Accordingly, only a traveling wave is sent through delay line 11. This wave is produced by a signal $f(t)$ impressed on transducer 12. The input signal must be brought within the frequency range of light modulator 10. For this purpose, the input signal is fed to a mixer 16 and is there heterodyned with the oscillations of oscillator 18 which may be adjustable. The output of mixer 16 may be then fed through a filter 20 adapted to select frequencies within the desired range of the light modulator. The frequency range of filter 20, for example, may be 2.5 to 3.5 megacycles.

The signals $f(t)$ from the output filter 20 energize transducer 12 and cause it to transmit sonic waves along delay line 11. The sonic waves produce stresses in the delay line which make it birefractive. A light beam 22 which may have a width equal to the major portion of the length of the delay line is adapted to pass through the delay line. The light beam is modulated in amplitude at a continuously varying frequency from one end thereof to the other. The range of the modulation frequencies is substantially equal to the frequency pass band of filter 20. More particularily, the intensity of the light beam may vary continuously across its width so that at every point the amplitude is equal to $(1+m \sin W_r t)$ where $W_r/2\pi$ varies continuously from 2.5 to 3.5 megacycles. Light beam 22 passes through a Polaroid plate 24, delay line 11, a quarter wave optical plate 26 and another Polaroid 28 before reaching a light integrating screen 30. Polaroids 24 and 28 are crossed and the quarter wave optical plate 26 is oriented so that the polarization produced by the bi-refractive characteristic of the delay line is converted into light intensity modulation proportional to the variation of the stress along the delay line 11. The light integrating screen 30 may be of any suitable type which is capable of producing a response proportional to the integral of the light falling on each elemental area thereof. It can be shown then that the response of the screen along its length will correspond to the frequency spectrum of the signal $f(t)$. The integrating screen 30 may, for example, be a photographic film or a screen similar to that used in a television camera tube. If a photographic film is used, it may be moved perpendicularly to the plane of the paper to give a continuous indication of spectrum of the input signal, and if the screen is the mosaic of a television camera, it will be scanned periodically to produce electrical or visible signals representing the spectrum. Means 31 for reproducing or reading out the signals on screen 30 in the manner indicated are well known in the art, as, for example, in Patent No. 2,664,243, and, therefore, are not here illustrated in detail. If the screen is a photographic film, the readout may consist of a flying spot of light and means for measuring accurately the light through the film in order to determine the opacity of the film as it is being scanned.

The operation of the apparatus described above will now be explained in more detail.

The beam of light is modulated so that at the lower end (the end near the transducer), the light beam is modulated with a sinusoidal waveform whose frequency is, say, 2.5 mc.; at the other end, the light beam is modulated with a sinusoidal waveform whose frequency is 3.5 mc. Between these two extremes, the light beam is also modulated and the modulation frequency varies linearly along the length of the delay line from 2.5 to 3.5 mc. The light emitted from the delay line modulator 10 is incident on an integrating screen 30.

It will be seen that at level $r$ along the light beam, the number of photons incident on the integrating screen during the time of integration T will be proportional to:

$$\frac{1}{T}\int_0^T [1+m_1 \sin w_r t][1+m_2 f(t)]dt$$

or:

$$=1+\frac{m_1 m_2}{T}\int_0^T F(t) \sin W_r t dt + \frac{1}{T}\int_0^T [m_1 \sin w_r t + m_2 f(t)]dt$$

where $f(t)$ is the input waveform to the transducer.

If the time of integration T is long compared with the reciprocal of the bandwidth (that is, compared in this case with one microsecond), the last integral of Expression 1 will be very nearly zero. The first integral is the well known expression used in Fourier analysis to establish the amplitude of the component having a rate of change of phase $w_r$.

The effect of the phase relationship between the light modulation of frequency $w_r/2\pi$ and the component of the input signal $f(t)$ of the same frequency is to produce an error. This error takes two forms: an error in the level along the light beam at which the integrated output is a maximum and a decrease in the integrated output. Both these errors, it can be shown, are very small.

Let us assume that the reaction of the integrating screen is proportional to the number of photons incident upon it during the integration time T. Expression 1 then indicates that at each point (exemplified by level $r$), the integrating screen will react proportionately to the first two terms of Expression 1. The first term, represented by the numeral 1, is a constant level over the whole length of the integrating screen so that it may be considered as a bias. The second term is proportional to the amplitude of the component having a rate of change of phase $w_r$, and it will appear on the integrating screen in the form of the number of photons incident upon it in excess of that corresponding to the constant level. The reaction of the integrating screen to the narrow line of varying light intensity incident upon it will, therefore, provide a quantitative spectrum analysis of the input signal.

The readout of this spectrum analyzer is the readout of the integrating screen. This readout is obtained by scanning the screen along the line where it has been excited by the incident light, and measuring the extent to which it has been excited.

In FIG. 1, the light beam incident on the modulating delay line 11 is shown as being modulated over a frequency band so that at every level there is only one frequency of modulation, and that frequency varies linearly over the length of the light-modulating delay line. Such a light beam can be obtained by the system depicted in FIG. 2.

Two light-modulating delay lines, A and B are used. The Polaroids and quarter-wave plates have not been shown in FIG. 2 because they are not needed for the explanation of the apparatus. The combination of the two delay lines causes the modulation produced by delay line A to be multiplied at each level by the modulation produced by delay line B.

A parallel beam of light 32 is incident on the two modulating delay lines A and B. Line A is excited with a wave $f_A(t)$ of constant amplitude in which the frequency varies uniformly with time by a transducer 33. Thus, at instant $t$, the wave form contained in this delay line varies as indicated by $f_A(t)$ in FIG. 2A along the length of the modulating delay line. An identical signal except for a shift in frequency excites the transducer 34 of modulating delay line B. The waveform along delay line B is indicated in FIG. 2A by the thick line marked $f_B(t)$. At some time later, indicated by $(t')$, the two waveforms have traveled a short distance in each delay line and the result is that the waveforms along the lengths of the delay lines are now those indicated in FIG. 2A by the light lines marked $f_A(t')$ and $f_B(t')$.

Examination of the waveforms along the modulating delay lines reveals that the frequency difference of the signals at level $r$ in the two delay lines is represented in FIG. 2A by distance PQ at the time $t$, and by distance RS at the time $t'$. It can be easily proven that these two distances are equal. Thus, at any level along the delay lines, the difference between the two frequencies in modulating delay lines A and B remains constant with time. As far as this difference is concerned, the light modulation emerging at the level $r$ retains, therefore, as one of its components, the form shown in Expression 2 below. The other terms can be eliminated in subsequent filtering.

$$1+m_r \sin w_r t \quad (2)$$

The complete expression for the modulation of the light emerging from the system is given by:

$$(1+m_A \cos w_{Ar} t)(1+m_B \cos w_{Br} t)$$

or:

$$1+\tfrac{1}{2}m_A m_B \cos (w_{Ar}-w_{Br})t + \tfrac{1}{2}m_A m_B \cos (w_{Ar}+w_{Br})t + m_A \cos w_{Ar} t + m_B \cos w_{Br} t \quad (3)$$

Of these five sinusoidal terms only $(w_{Ar}-w_{Br})$ is constant with time.

From the point of view of the operation indicated in FIG. 1, the third, fourth, and fifth terms of Expression 3 are of no interest, since their integrated values are close to zero. In addition the frequencies represented by $(w_{Ar}+w_{Br})$, $w_{Ar}$ and $w_{Br}$ will generally be outside the range of the input signal for which the spectrum analyzer is designed. There are left, therefore, only the first two terms which are the same as those of Expression 2 when $m_r$ is substituted for $\tfrac{1}{2}m_A m_B$ and $w_r$ is substituted for $(w_{Ar}-w_{Br})$. There is thus produced an incident light with the special modulation described above.

FIG. 3 shows schematically a system which may be used to counteract defects in the optical system and non-uniformity in the integrating screen which may occur in the apparatus shown in FIG. 1. A pair of identical light beams 40 and 41 are modulated as described in connection with FIG. 1 and pass through two identical optical paths. Each of these paths may contain the light modulators 42 and 43 each similar to that shown in FIG. 1. The signal to be examined $f(t)$, is impressed on only one of the light modulators 43. An optical system which may include mirrors 44 and 45 is provided to bring the light beams on the integrating screen 46 very close to each other. The line produced by light beam 41 will represent the spectrum of the input signal and the line on screen 46 produced by light beam 40 will provide a reference level. The ratio of the intensity of the responses produced on screen 46 by beams 40 and 41 may be measured at each point along lines 47 and 48 by any of the scanning or other methods already discussed or known in the prior art. In a television camera tube the electron beam may scan each level $r$ of lines 47 and 48 successively as the electron beam is moved along the lines. Since the two light beams traverse identical optical paths except that one passes through a light modulator which is energized, the ratio of the readings provided by the two light beams will automatically include corrections for the imperfections in the optical system and nonuniformity in the integrating screen.

According to FIG. 4 the analysis of the spectrum is carried out in three parts. The input signal is fed through a mixer 16 connected to an oscillator 18 and a single sideband filter 20 and a suitable amplifier or filter 21 corresponding to frequency conversion elements 18–20 of FIG. 1. The output of filter 20 is supplied to a coarse spectrum analyzer 50 which may be of the form shown in FIGS. 1 and 2. The outputs of tuned amplifier 21 is also supplied to a mixer 52 where it is heterodyned by a variable oscillator 53 which may be adjusted so as to produce an I.F. frequency from the output of mixer 52 equal to about .5 megacycle. The filter 54 may have a band width of about 50 kc. if it is more convenient to pass a double sideband rather than a single sideband. Oscillator 53 may be adjusted so as to bring any portion of the 2.5 to 3.5 megacycle band within the range of filter 54. The spectrum analyzer 55 is connected to the output of filter 54 and is similar to spectrum analyzer 50 except that the light beam modulation varies over a range of 25 kc. and is centered about a frequency of .5 mc. A third channel consisting of mixer 56, variable oscillator 57, filter 58 and spectrum analyzer 60 is similar to channel 52–55 with the exception that filter 58 has a narrower pass band than filter 54, for example, a pass band which is only 2 kc. wide. Further, spectrum analyzer 60, in which the light beam modulations extend over a range of only 1 kc. By suitably adjusting oscillators 53 and 57 it will be understood that spectrum analyzers 55 and 60 will provide a medium and a fine resolution of any portion of the spectrum presented by coarse analyzer 50. The bandwidths of spectrum analyzers 55 and 60 shown as being one half that of filters 54 and 58 since it is assumed that only one sideband of the output waves of mixers 52 and 56 is to be examined.

Referring to FIG. 5 light from the source 62 is formed into a parallel light beam by a lens 64. The beam then passes through a modulator comprising crossed Polaroids 65 and 66. A transparent delay line 70 and a quarter wave optical plate 72 of the same type as those shown in FIG. 1. An input signal is impressed on transducer 74 to cause a sonic wave 75 to travel through delay line 70 to an absorber 76 which prevents reflections at that end of the delay line.

Near one face of delay line 70 a mask 80 is provided which contains a plurality of narrow slots having a spacing of approximately one wave length of the wave in the sonic delay line. The light passing through each slot is modulated by the delay line so that for a frequency the sonic wave length of which is equal to the spacing or a submultiple of the spacing between the slots, the light which passes through the slots will be modulated in the same phase. The light modulations from all the slots are then collected or focused by a lens 82 on a photocell 84 at which the light adds up arithmetically for this frequency. For any other frequency, however, the modulations of the light passing through the slots will not be in phase and the modulation at the photocell will therefore be less. It is readily shown that if there are N slots covering the length L of the delay line, the frequency for maximum response of the photocell is given by $$f = nc\frac{N}{L}$$

where $c$ is the sonic velocity and $n$ is an integer.

If a frequency $$f\frac{n \pm 1}{n}$$

is fed into the line, the light that reaches the photocell will have zero modulation. It is seen, therefore, that the frequency resolution is of the same order as the number of slots. Since the wave length can be as small as .01 centimeter, the number of slots can be very great. The apparatus therefore may have a very great frequency resolution and act as a very sharp filter. The sharpness will be a function of the number of slots and the time of integration of the photocell circuit. The photocell 84 may be connected across a suitable integrating circuit 85 and to an amplifier 86 to produce an output frequency corresponding to the spacing of the slots in mask 80.

In FIG. 5 it is possible to replace the mask 80 which is shown as a fixed mechanical structure by a sonic mask. The mask 80 would then be replaced by a transparent modulating line similar to the modulator 10 of FIG. 1 with associated crossed Polaroids, but without the quarter wave plates which, in this case, would be unnecessary. Standing waves set up in this line would produce the same effect as the slots of mask 80. This technique has the advantage that the frequency could be easily changed by a change in the frequency of the exciting oscillator so that this sonic mask would have a controllable spacing between the slots.

FIG. 6 schematically shows a system in which apparatus operating according to the principles of the system of FIG. 5 may be utilized to produce a spectrum analyzer. The apparatus includes a light source, lens, and a light modulator similar to that in FIG. 5, but the mask 80 instead of being placed parallel to the delay line is placed at an angle to it and is indicated in FIG. 6 at right angles to the delay line. The parallel beam of light 81 passing through the delay line assembly is dispersed by a dispersive plate 82 which is indicated in more detail in FIG. 6A. The purpose of this plate is to refract the rays upwardly and over a wide angle. For this purpose the plate 82 may be provided with roughened surface, or a variably prismatic surface in which the elemental prisms are small compared to a sonic wave length and the prisms are irregular or roughened so as to disperse the light over the desired angle. The light is then focused by a lens 84 on the integrating screen FF which may be of the types already mentioned. The presence of a frequency in the signal is evidenced not by a change in the average light intensity at the point corresponding to that frequency but as a variation with time of the light intensity of that frequency. Various methods may be used for detecting and measuring this variation or rendering it visible. The screen may be, for example, a phosphor screen having a non-linear response, in which case the average brightness at any given point would correspond to the magnitude of the modulation. Alternatively, a photocell may be placed in each point $F_1F_2$, etc., or moved along the line. At each point, then, the photocell would have an output of a different frequency characteristic.

Figure 7:
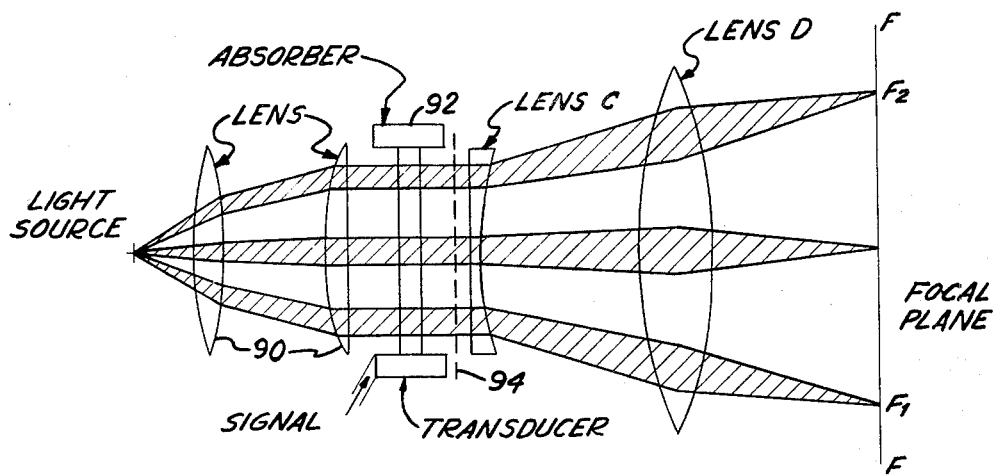
FIG. 7 is a schematic view of a spectrum analyzer according to another embodiment of my invention.

FIG. 7 shows another embodiment of my invention similar in principle to the apparatus illustrated in FIGS. 5 and 6. The lens system 90 produces a parallel beam through the light modulator 92 wherein the Polaroid and the quarter wave plates have been omitted in order to simplify the diagram. The mask 94 differs from that previously described in that the slots are not equally spaced but are closely spaced at, say, the top and widely spaced at the bottom of the mask. It will be apparent from what has already been said in reference to the operation of the apparatus of FIGS. 5 and 6 that where the spacing varies linearly along the length of the delay line, the slots at the bottom of the mask will in effect filter out the low frequencies and the slots at the top of the mask will filter out the high frequencies of the modulations produced in the light beam by the sonic wave through the light modulator 92. By means of a suitable lens system indicated by lenses C and D, the light traversing various portions of mask 94 may be spread over an integrating screen FF in the focal place of the lens system. Thus, a complete spectrum is obtained by focusing the modulated light from different parts of the delay line assembly on different parts of screen FF. Lenses 90 insure that the light passes through the delay line substantially parallel to the sonic wave form therein. At various focal points $F_1$ and $F_2$ the collected light will be modulated at high and low frequencies respectively. Thus, the light focused on the screen indicates at each point the presence of a particular frequency. It should be noted, however, that the presence of a particular frequency is indicated not by the increased average intensity but by a variation of intensity with time at a rate equal to the frequency being indicated.

In FIG. 1, the sonic wave is shown as traveling over a delay line. For this application, the concept of delay is not necessary. What is important is that all of the sonic wave carrying the signal passes every portion of the modulated light beam. Other structures not shown are capable of producing the same result.

In all figures where Polaroids and quarter wave plates are used, the Polaroids are crossed and their axes are set at an angle of 45° to the sonic wave front. In such a system which does not have a quarter wave plate inserted between the Polaroids, the characteristic curve relating the light intensity output to the intensity of the sonic wave front is that shown in FIG. 8. The curve is sinusoidal. The part of this characteristic curve used does not normally extend beyond the line AB. When a quarter wave plate is inserted between the Polaroids with its axis parallel or perpendicular to the sonic wavefront, the operating point is shifted from the point $O_1$ to the point $O_2$. This shift is of some importance because the applied voltage to the transducer which produces the sonic wave then operates on a portion of the characteristic which is linear. In many cases, it may not be necessary or even desirable to use a quarter wave plate. It is seen that the quarter wave plate acts essentially to produce a bias. The bias can be shifted by changing the orientation of the quarter wave plate. When the axis of the quarter wave plate is at 45°, that is, parallel to the axis of one of the Polaroids, the origin is put back to the point $O_1$. Any intermediate position will shift the origin to some point between the point $O_1$ and the point $O_2$.

The embodiment of the invention shown in FIG. 9 is similar to that shown in FIG. 5, and like FIG. 5, it contains a solid birefractive delay line 110 having a piezoelectrical input transducer 111 and sonic energy absorber 112, a pair of crossed polarizers 113 and 114 sandwiching said delay line, a quarter wave plate 118, a light source 116, a collimating lens 117 for directing a parallel light beam 115 from source 116 through the delay line, polarizers, etc., to lens 120 which focuses the output light pattern on photocell 121.

With the system of FIG. 9 as thus far described, it will be appreciated that upon the application of an electrical signal to the piezoelectric transducer 111, a stress pattern is set up along the length of the delay line 110, corresponding at any instant to the waveform of that portion of the input signal then distributed in the space domain of the delay line. Accordingly, the light output passed by the second polarizer 114 at any instant, embodies an intensity pattern, distributed over its length corresponding to the length of the delay line 110, wherein the intensity variations correspond to the stresses present in the related portions of the delay line. Hence, the light intensity variation pattern existent at any moment as the light output along the length of the second polarizer 114, corresponds to the waveform carried over the length of the delay line at that instant.

In addition to the foregoing structure, the present embodiment of the invention further includes a fixed optical mask 119. This mask is analogous to the mask 80 in FIG. 5, but it is formed with a pattern of different degrees of opacity along that axis corresponding to the length axis of the delay line 10. The opacity pattern is chosen to represent any desired function or waveform, such for example as a complex frequency and amplitude signal. The mask may conveniently be fabricated by shaping a plate, or by absorption of light on a photographic film. The latter type mask may be fabricated, for example, by applying the function or waveform desired on the mask to the delay line 110, and applying the resultant light output from polarizer 114, corresponding to this waveform, to a photographic plate. With the mask of selected or known function positioned in the system and an unknown function applied as the input signal to the transducer 111, the overall light output of the system as distributed over the operative length of the delay line at any instant, is indicative of the degree to which the selected function is found at that instant in the unknown input signal. Thus, the extent, or instant, of appearance of the selected function on the delay line is obtained as a correlation function in the light output of the system.

By integrating the entire light output of the system, one obtains the correlation function in the time domain of the unknown input signal and the function defined on the mask 119. This result is obtained by concentrating the entire light output of the system, as by lens 120, on a photoresponsive or photosensitive element 121. The variations with time of the total light output of the screen are thus converted into corresponding electrical values constituting the correlation function in the time domain. The response of the photosensistive element 121, may be amplified at 122, and thus applied as the output 123 of the present system.

Considering the operation of the present system mathematically, the mask 119 is designed to decrease the light emerging out of the system in accordance with a function.

$$1 + m_1 f_1(\tau) \quad (4)$$

where $\tau$ is a measure along the delay line as shown, and is equal to the time a sonic wave takes to travel that distance along the delay line from the transducer 111.

If an electrical signal having a waveform $f_2(t)$ is applied to the transducer 111, the light intensity emerging from the polarizer 119 at the level $\tau$ along the delay line will have the form $$1 + m_2 f_2(t - \tau) \quad (5)$$

where $m$ is a constant which depends on the light intensity, the power of the input signal and the electro-optic characteristics of the delay line 110. The light intensity emerging from the mask 119 will have the form:

$$[1 + m_1 f_1(\tau)][1 + m_2 f_2(t - \tau)] \quad (6)$$

And the total light incident, I, on the photocell is $$I = \int_0^T [1+m_1 f_1(\tau)][1+m_2 f_2(t-\tau)]d\tau \quad (7)$$

Since $f_1(\tau)$ and $f_2(t)$ are as much positive as negative, they integrate to zero, assuming that T is long compared with the length of the variations of these functions. The resulting expression for the light intensity is $$I = T + m_1 m_2 \int_0^T f_1(\tau) \cdot f_2(t-\tau) d\tau \quad (8)$$

The usual form of a cross-correlation function $R(\tau)$ is:

$$R(\tau) = \int_{-\infty}^{+\infty} f_1(t) \cdot f_2(t-\tau) dt \quad (9)$$

in which R is expressed as a function of the delay or the length along the delay line.

A comparison between Expressions 8 and 9, shows that Equation 8 can be expressed in the form:

$$I = T + m_1 m_2 R(t) \quad (10)$$

in which $R(t)$ is the same cross-correlation function as $R(\tau)$ but in the time domain, with the approximation that the integral is limited to the time T, the total length of the delay line. The waveform of the output of the photocell is therefore the cross-correlation function.

If a correlation funciton occurs in the output of the photocell, it will indicate that the waveform $f_1(t)$ is present in the input waveform $f_2(t)$ and the time occurrence will indicate when this waveform appears. When $f_1(t)$ and $f_2(t)$ are the same, a Fourier analysis of the correlation function gives the power spectrum of the $f_1(t)$.

An example of a specific application of the present invention is to radar. Assume a pulse comprises a waveform $f_1(t)$. The return pulse may be slightly distorted and is mixed with noise. This return signal is $f_2(t)$ and is applied as the input to transducer 111. The waveform $f_1(t)$ is described on the mask 119. The time at which the return signal occurs will appear in the correlation function comprising the output at 123, and accordingly will give the range of the target.

Essentially, the present system is equivalent to a matched filter in which a fixed optical mask 119 is used instead of electronic circuits. Since such electronic circuits are unually large and difficult to design except for the simplest waveforms, and often procure only rough approximations of the desired performance, the invention makes it possible to produce a very accurate matched filter for any desired waveform; in addition, the unit is simple, rugged, and compact.

It will be noted that all the details, i.e., both frequency and amplitude components, of the waveform $f_1(t)$ and $f_2(t)$ are contained in the space or time covered by the delay line 110, so that the correlation function that appears at the output 123 contains the fine structure of the correlation function as well as the envelope, that is the entire frequency and amplitude structure of the waveform.

Figure 8:
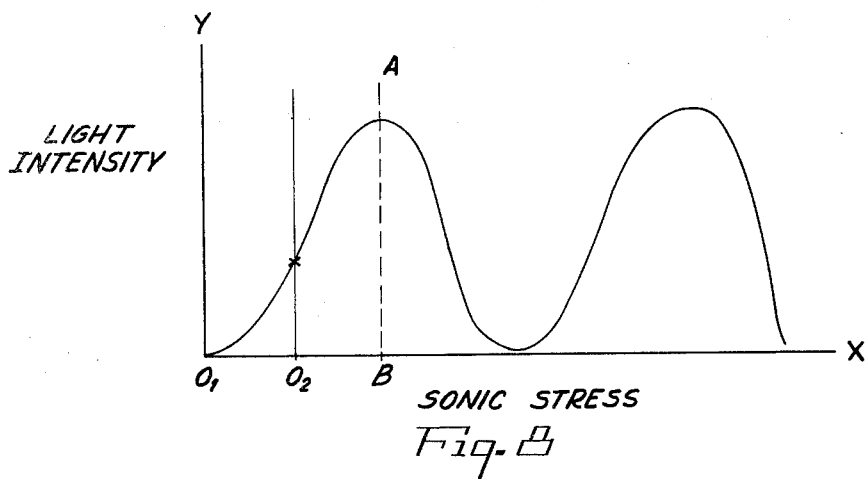
FIG. 8 is a graph indicating the light modulation characteristic of a sonic delay line.

A modification of the system makes it possible to operate with the origin of the stress-optical characteristic shifted somewhat to the left of $O_2$ in FIG. 8, where the zero sinal light intensity is low and the noise produced by the system is correspondingly low. In this modification, two delay line systems and photocells are used, one for the negative values and the other for the positive values. This modification is illustrated in FIG. 10, and since each delay line system corresponds in structure to that of FIG. 9, the corresponding parts are given like numerals, and need not be further described. The waveform $f_2(t)$ is divided into two parts, plus and minus, by separator 128, and the plus portion is fed to the plus transducer 111a, while the negative part is fed to the minus transducer 111b. Two masks are used, the plus mask 119a blanks out the negative values of $f_1(t)$ and the minus mask 119b blanks out the positive values.

Two photocells 121a and 121b are used, and they are carefully balanced. The outputs of the photocells are subtracted at 125, the output 126 giving the cross correlation function as before. Thus the average light intensity in both cells is low and the noise produced in converting from light intensity to electrical voltage is also low.

Although the masks 119, 119a, and 119b in the embodiments of FIGS. 9 and 10 may be conveniently located at the light output side of polarizers 114, it is apparent that the mask may be inserted in the system anywhere between lenses 117 and 120.

In the foregoing embodiments, the disclosed systems are described as employed to ascertain what amount of the function contained on the mask is found in the applied signal. The system, particularly in the form of FIG. 9, may also be employed to generate a complex signal of any desired waveform. To this end, the waveform desired is embodied in the mask 119, and the input to transducer 111 is a sharp pulse which then travels along the delay line 110. From the previous description, it is apparent that the output of photoresponsive element 121 will be the function obtained from the mask. If input pulses are applied at intervals, one obtains the same waveform for each pulse correspondingly spaced in time. If several pulses are present in the delay line at the same time, the successive waveforms overlap in time. This phenomenon may not be apparent to one who does not know the waveform; hence, an apparent wide variety of outputs can be obtained form a single mask by programming the time of applied pulses, and this can constitute the basis of a security code, whose key resides in the fundamental waveform, or mask, and the applied pulse sequence.

A modification of the present invention as illustrated in FIGS. 1 and 2 is shown in FIG. 11, particularly with respect to the means for obtaining a light beam having a variation in frequency along one of its transverse dimensions. In FIG. 11, there is shown a delay line panel or slab 140 having a significant length and width, with a piezoelectric transducer 141 applied along the entire width dimension at one end of the delay line, and an ultrasonic absorber 142 correspondingly positioned at the other end of the delay line. Light from source 148 is converted into a parallel beam by lens 149, and then applied through light polarizer 146, quarter wave plate 145, through the thickness dimension of delay line 140, and light polarizer 147, crossed with respect to polarizer 146. The light passed by polarizer 147 is applied to mask 143, thence through a semiconvex lens 144 which converges the light output of mask 143 to substantially a line running the width dimension of delay line slab 140. Thus, the entire light output of any length dimension line on delay line 140 is integrated into one spot on the light line output of lens 144. This output is focused along the length of narrow ultrasonic delay line 150, after passing through quarter wave plate 154. Delay line 150 also includes a piezoelectric input crystal 151 at one end and an ultrasonic energy absorber 152 at the other end. Light passed by delay line 150 is applied to light polarizer 153, crossed with respect to polarizer 147, and the light output of polarizer 153 is impinged upon the photoresponsive plate 155, intended to be electrically scanned, similar to a television camera pick-up screen.

In view of the previous discussion, it is apparent that if a sharp pulse is applied to input transducer 141, the intensity of the light line output on delay line 150 will vary as a function of the pattern on the optical mask 143. Also, since for any given horizontal line across delay line 140 (i.e., any length dimension line between transducer 141 and absorber 142) the function across the mask for that line may be different from the mask function for another given line, the spot on the light line output of lens 144 corresponding to one of said given lines, may vary in intensity in accordance with a different function than that corresponding to the other of said given lines.

When an electrical waveform having a function $f(t)$ is applied to the input transducer 151 of delay line 150, as it passes along this delay line, the light output passed by polarizer 153 will then constitute a measure of the amount of each of the different functions embodied in mask 143 (now represented in light variations in the light line applied to delay line 150) that is found in the waveform $f(t)$, and these output functions are integrated on the corresponding areas of photosensitive screen 155. By electrical scanning of screen 155, an analysis is obtained of the input waveform $f(t)$ in terms of the function defined by the mask 143. This output analysis is obtained in the time domain, as an electrical output at 160.

Considering the operation of the system of FIG. 11 in greater detail mathematically, when a signal $f(t)$ is introduced in the thin delay line 150 at 151, at level P, corresponding to level AB in mask 143, it will be $f(t-\tau)$. If at this level and time the waveform of the mask is $F(t-\tau)$, then the emerging light will have an intensity $$[1+mf(t-\tau)]F(t-\tau) \tag{11}$$

When integrated by a scanned photosensitive screen 155, at the level $\tau$, the response will be proportional to $$\int_0^T f(t-\tau) \cdot F(t-\tau) dt \tag{12}$$

neglecting the other two terms, one of which is constant and the other is generally zero. Since the delay $\tau$ is common to both, this may be approximately written when T is reasonably large $$\int_0^T f(t)F(t)dt \tag{13}$$

An application of this is to Fourier analysis. If the mask 143 is designed to produce sine waves, as schematically indicated in FIG. 11, from frequency $f_1$ at the bottom to frequency $f_2$ at the top changing linearly, during one swing of the pulse through the delay slab 140, the light intensity at the thin delay line 150 will be modulated sinusoidally at one frequency at each level, that frequency changing linearly from $f_1$ to $f_2$.

At the level of P, this frequency is $w/2\pi$. Then the screen will expand proportionately to $$\int_0^T f(t) \sin wt dt \tag{14}$$

which is the sine component of all the energy of frequency $w/2\pi$ in the signal $f(t)$. Thus, there will be recorded on the photosensitive screen how much of each frequency between $f_1$ and $f_2$ is contained in $f(t)$ during the time of travel of the pulse.

Alternatively, the pulse may be replaced by a fixed slot and the mask moved in front of it.

Having thus described the present invention in terms of its preferred specific embodiments, it is understood that the present invention is not limited thereto, but that such changes, modifications, and variations as are embraced by the spirit and scope of the appended claims, are contemplated as within the purview of the present invention.

What is claimed is:

1. Apparatus for measuring the frequency components of an electrical signal wave comprising means for producing a light beam amplitude modulated with modulation frequencies which vary uniformly throughout a given range along the width of the light beam, light modulating means interposed in the path of said beam for modulating the amplitude of said light beam in accordance with said signal, said light modulating means including a transparent sonic wave transmitting line in the path of the light beam and means responsive to the signal for transmitting a "travelling" sonic wave across the width of the light beam through said line in response to the signal, and a light integrating screen positioned to intercept the light beam after it has passed through the light modulating means.

2. Apparatus according to claim 1 wherein the light modulating means includes a pair of crossed Polaroids on opposite sides of the sonic wave line.

3. Apparatus according to claim 2 including a quarter wave optical plate interposed in the path of the light beam between the line and one of the Polaroids.

4. Apparatus according to claim 1 wherein the light beam producing means comprises light intensity varying means including a pair of parallel transparent sonic delay lines, a pair of electroacoustic transducers connected to opposite ends of the pair of delay lines, sonic wave absorbing means connected to the ends of the pair of delay lines opposite the transducers, and means for impressing a first electrical wave on one of the transducers varying in frequency in a linear saw-tooth manner throughout a given frequency band and for simultaneously impressing a second electrical wave on the other transducer synchronously varying in frequency at the same rate as said first electrical wave.

5. Apparatus according to claim 1 comprising means for producing a second modulated light beam substantially identical to the first mentioned beam, a second light modulating means in the path of said light beam including a sonic wave delay line which is unstressed by said electrical wave and optical means for causing the light beam traversing the second light modulating means to fall on the light integrating screen adjacent the light beam traversing the first light modulating means.

6. Apparatus according to claim 1 including means for heterodyning said electrical signal wave to a substantially lower frequency band than the frequency band of said electrical wave, light modulating means as described in claim 1 including a transducer connected to said heterodyning means for receiving said reduced frequency band of signals and means for producing a parallel beam of light in the path of the line of the second modulating means which is continuously modulated along its length at a frequency which varies within a narrower band than the modulations of the first mentioned light beam.

7. Apparatus according to claim 6 including a second heterodyning means for converting said electrical wave to a lower frequency than the frequency of said wave, means connected to the second heterodyning means for selecting a narrower frequency band of the output signals therefrom than the frequency band of the signals supplied to the transducers of the first and second light modulating means, light modulating means as described in claim 1 having a transducer connected to said selecting means, and means for producing a modulated light beam having modulation frequencies lying within said narrow frequency band.

8. Apparatus for detecting the presence of a frequency component in an electrical wave comprising means for producing a parallel light beam, light modulating means interposed in the path of said light beam comprising an elongate linear transparent birefractive sonic delay line, a transducer connected to one end of said delay line and adapted to be supplied with said electrical wave, sonic wave absorbing means at the other end of said delay line for absorbing substantially all of the sonic wave at said other end of the line, said light beam having a cross-section wide enough to illuminate a substantial portion of the length of the delay line, a mask interposed in the path of said light beam, said mask having a plurality of transparent portions distributed across the width of the light beam and having a spacing corresponding to an integral number of wave lengths in said delay line of said frequency component, and means for collecting said light beam after it has traversed said mask and delay line and producing an electrical signal corresponding to the modulation of the light beam.

9. Apparatus according to claim 8 wherein said transparent portions of the mask are regularly spaced slots.

10. Apparatus according to claim 8 wherein the mask includes slots having different spacings along different portions of the light beam and means for separately collecting said different portions of the light beam and producing the output signals corresponding to any one of said different portions of the light beam.

11. Apparatus according to claim 9 wherein said mask is placed at an angle to the sonic delay line, means interposed in the path of the light beam after the delay line for dispersing the light beam so that a portion of the light beam traverses different portions of said mask in different directions, means for collecting and indicating the magnitude of said different portions of the light beam.

12. Apparatus for measuring the frequency components of an electrical signal wave, comprising means for producing a light beam, means for modulating the amplitude of the light beam at frequencies varying throughout a given range along the cross-section of the light beam, light modulating means interposed in the path of said beam for modulating said light beam in accordance with said signal, said light modulating means including a transparent sonic wave transmitting line in the path of the light beam and means responsive to the signal for transmitting a 'travelling" sonic wave thorugh said line in response to the signal, and a light integrating means positioned to intercept the light beam after it has passed through both modulating means.

13. Apparatus for measuring the frequency components of an electric signal wave comprising means for producing a sheet-like light beam, means for modulating the amplitude of the entire light beam simultaneously at frequencies varying throughout a given range along the width of the light beam, means for polarizing said light beam, light modulating means interposed in the path of said beam for modulating the angle of polarization of said polarized light beam in accordance with said signal, said light modulating means including a sonic wave transmitting, transparent, birefractive line in the path of the light beam, means responsive to the signal for transmitting a "travelling" sonic wave through said line in response to the signal, and a polarizing means and a light integrating means positioned to intercept the light beam after it has passed through the light modulating means.

14. Apparatus according to claim 8 wherein said mask comprises a transparent sonic wave transmitting line, and means for producing sonic standing waves in said line having the frequency of said frequency component.

15. Apparatus for modulating the intensity of a light beam comprising a pair of parallel transparent sonic wave transmitting lines formed of a material which is birefractive under stress, a pair of electroacoustic transducers connected to opposite ends of respective ones of the pair of transmitting lines, sonic wave absorbing means connected to the ends of said lines opposite the transducers, and means for impressing a first electrical wave on one of the transducers varying in frequency in a linear saw-tooth manner throughout a given frequency band and for simultaneously impressing a second electrical wave on the other transducer varying in frequency at the same rate as said first electrical wave and in synchronism therewith.

16. Apparatus for determining the frequency components of a signal, comprising means for producing a light beam having an intensity which is modulated at each point along one transverse axis at a given frequency, said frequency varying uniformly throughout a given range along said axis of the light beam, light modulating means interposed in the path of said beam for modulating the intensity of said light beam in accordance with the said signal, said modulating means including elongate means for conveying the signal unidirectionally across said axis of the light beam to progressively modulate successive portions of the light beam, and light integrating means for intercepting the light beam after modulation.

17. A cross-correlator comprising a solid state, transparent, birefractive, ultra-sonic delay line sandwiched between two crossed light polarizers, an electrical-sonic transducer for converting an electrical signal to a sonic input to one end of said delay line, a fixed optical mask having different degrees of opacity along its extent definitive of a selected waveform, means for passing a beam of light through said delay line, polarizers, and mask, and photoresponsive means for integrating with respect to time the entire light output from said delay line, polarizers, and mask, whereby the electrical output of said photoresponsive means provides a correlation function in the time domain between said selected waveform and the electrical input to said delay line.

18. A cross-correlator as set forth in claim 17, and further including a quarter wave optical plate between said polarizers.

19. A cross-correlator as set forth in claim 17, wherein said intergrating means includes optical means for concentrating the light output of said delay line, polarizers, and mask.

20. A cross-correlator comprising means for continuously converting a selected time interval of an electrical signal in the time domain to a corresponding light pattern in the space domain of different degrees of intensity definitive of the waveform of said signal including the fine structure and envelope of said signal, a fixed optical mask interposed in the optical path of said converting means, said mask having different degrees of opacity provided along its extent definitive of a selected waveform including the fine structure and envelope of such waveform, and photoresponsive means for integrating with respect to time the entire light output from said converting means and mask, whereby the electrical output of said photoresponsive means provides a correlation function in the time domain between said selected waveform and the electrical signal, said output of said photoresponsive means including the fine structure and the envelope of the correlation function.

21. In a radar system, means for filtering from a received electrical signal a prescribed complex waveform, forming at least a portion of the transmitted radar signal, for ascertaining the time interval between transmission and reception of said prescribed waveform, said filtering means comprising means for continuously converting a desired time interval of the received electrical signal to a light pattern in the space domain having different degrees of intensity definitive of the waveform of the instantaneous interval of the signal being received, including the fine structure and the envelope of said signal, a fixed optical mask interposed in the optical path of said converting means, said mask having different degrees of opacity provided along its extent definitive of the light pattern obtained by said converting means for said prescribed complex waveform including the fine structure and envelope thereof, and photoresponsive means for integrating with respect to time the entire light output from said converting means and mask, whereby the electrical output of said photo-responsive means provides a correlation function in the time domain between said prescribed complex waveform and the received signal, said output of said photoresponsive means including the fine structure and the envelope of the correlation function.

22. In a radar system, means for filtering from a received electrical signal a prescribed complex waveform forming at least a portion of the transmitted radar signal, for ascertaining the time interval between transmission and reception of said prescribed waveform, said filtering means comprising a solid state, transparent, bi-refractive, ultrasonic delay line sandwiched between two crossed light polarizers, an electrical-sonic transducer for converting the received electrical signal to a sonic input to one end of said delay line, a fixed optical mask having different degrees of opacity along its extent definitive of said prescribed complex waveform, means for passing a beam of light through said delay line, polarizers, and mask, and photoresponsive means for integrating with respect to time the entire light output from said delay line, polarizers, and mask, whereby the electrical output of said photoresponsive means provides a correlation function in the time domain between said prescribed complex waveform and the received signal.

23. A cross-correlator comprising two separate means for continuously converting a selected time interval of an electrical signal in the time domain to a light pattern in the space domain of different degrees of intensity definitive of the waveform of said signal, a fixed optical mask interposed in the optical path of each of said converting means, means for separating the positive and negative portions of the signal and applying the positive portion to one of said two converting means and applying the negative portion to the other of said two converting means, said masks having different degrees of opacity provided along their extents definitive of a selected waveform, the mask associated with said one converting means being definitive of the positive portion of said selected waveform and the mask associated with said other converting means being definitive of the negative portion of said selected waveform, photoresponsive means associated with each converting means for integrating with respect to time the entire light output of its respective converting means and associated mask, and means for subtracting the electrical output of one photoresponsive means from that of the other, to provide a correlation function in the time domain between said selected waveform and the electrical signal.

24. An electro-optical system for analyzing a waveform, comprising a first ultrasonic delay line sandwiched between two crossed light polarizers, said delay line having appreciable length and width dimensions and including an electrical-sonic transducer input extending over an appreciable length of the width dimension, an optical mask associated with said delay line defining different waveforms at different areas along the dimension corresponding to the width dimension of the delay line, a second delay line also sandwiched between crossed light polarizers, an electrical-sonic transducer input for said second delay line, a lens interposed between said delay lines for converging light passed through said first delay line about the width axis of said first delay line to focus a line of light on said second delay line extending along the width dimension of said first delay line, and photoresponsive means positioned to receive light passed by said second delay line, whereby the application of an input pulse to said first delay line and an input waveform to said second delay line provides a light output from said second delay line indicative of the amount of each of the waveforms defined by said mask contained in said input waveform.

25. A system as set forth in claim 24, wherein each of said delay lines is a transparent solid state device.

26. A system for analyzing a signal, comprising means for generating a beam of energy and for amplitude modulating it, said amplitude modulation being different at different transverse areas of said beam, means for transforming a signal into a form capable of affecting said beam of energy in accordance with a characteristic of the waveform of said signal, said amplitude modulation being related to said characteristic, means for conducting the transformed signal across said beam of energy, means for detecting the combined effect of the amplitude modulation and the transformed signal upon said beam of energy, and means for integrating the detected effect.

27. An electro-optical correlator comprising means for continuously converting a selected time interval of an electrical signal in the time domain, the complete waveform of which is composed of the instantaneous carrier frequencies and the modulations thereof, to a light pattern in the space domain of different degrees of intensity definitive of the entire frequency and amplitude components of the waveform of said signal, a fixed optical mask interposed in the optical path of said converting means, said mask having different degrees of opacity provided along its extent definitive of the entire frequency and amplitude components of a selected waveform, and electrical photoresponsive means for integrating with respect to time the entire light output from said converting means and mask, whereby the electrical output of said photoresponsive means provides a correlation function in the time domain between said selected waveform and the electrical signal, said output of said photoresponsive means including the entire frequency and amplitude components of the correlation function.

28. An electro-optical correlator as set forth in claim 27, wherein said converting means comprises a solid state, transparent, ultrasonic delay line sandwiched between two crossed light polarizers, an electrical-sonic transducer for converting said electrical signal to a sonic input to one end of said delay line, and means for passing a beam of light through said delay line, polarizers, and mask.

29. In a radar system, means for filtering from a received electrical signal a prescribed complex waveform forming at least a portion of the transmitted radar signal, for ascertaining the time interval between transmission and reception of said prescribed waveform, said filtering means comprising means for continuously converting a desired time interval of the received electrical signal, the complete waveform of which is composed of the instantaneous carrier frequencies and the modulations thereof, to a light pattern in the space domain having different degrees of intensity definitive of the entire frequency and amplitude components of the waveform of the particular interval of the signal being received, a fixed optical mask interposed in the optical path of said converting means, said mask having different degrees of opacity provided along its extent definitive of the entire frequency and amplitude components of the light pattern obtained by said converting means for said prescribed complex waveform, and electrical photoresponsive means for integrating with respect to time the entire light output from said converting means and mask, whereby the electrical output of said photoresponsive means provides a correlation function in the time domain between said prescribed complex waveform and the received signal, said output of said photoresponsive means including the entire frequency and amplitude components of the correlation function.

30. In a radar system as set forth in claim 29, said converting means comprising a solid state, transparent, birefractive, ultrasonic delay line sandwiched between two crossed light polarizers, an electrical-sonic transducer for converting the received electrical signal to a sonic input to one end of said delay line, and means for passing a beam of light through said delay line, polarizers, and mask.

31. In a device of the type described, a correlator mask comprising a series of spaced parallel substantially opaque strips forming a series of light transmissive slits therebetween and across substantially the entire optical aperture, the width of each said strip being substantially equal to the width of one adjacent slit and each succeeding strip width differing from the width of the preceding strip, the total strip width variation determining the system band width and the distance between the leading edge of adjacent strips being equal to one wavelength whereby a moving electronic pulse carrier energy waveform image may be superimposed on the resultant diffraction grating and detected photosensitively.

32. In a device of the type described, optical means producing a moving waveform image of an applied electrical signal, an optical mask arranged to intercept the moving waveform image, and photosensitive means detecting the moving waveform image as modified by said mask, said mask comprising a series of spaced parallel substantially opaque strips forming a series of light transmissive slits therebetween, the width of each said strip being substantially equal to the width of one adjacent slit and each succeeding strip width differing from the width of the preceding strip, and the distance between the leading edge of adjacent strips being equal to one wavelength.

33. In a communications system for transmitting and receiving signals of electromagnetic energy, optical means producing a moving waveform image of a received signal, a correlator mask arranged to intercept the moving waveform image and having a series of relatively light transmissive slits separated by relatively opaque strips of a width and spacing representing a stationary reproduction of the intercepted waveform image, and photosensitive means detecting the waveform image as modified by the slits in said correlator mask to provide an electrical current output containing the correlation function of said mask and intercepted waveform image.

34. In a communications system as set forth in claim 33, additional means for generating an electrical signal having a waveform corresponding to the optical pattern on said correlator mask and for transmitting it in electromagnetic energy form, said received signal being a portion of the energy of the transmitted signal.

35. In a communications system as set forth in claim 34, said additional means comprising optical means producing a moving waveform image of a pulse of electrical energy, a function generator mask substantially identical in optical pattern to said correlator mask and arranged to intercept the last-mentioned moving waveform image, and photosensitive means detecting the last-mentioned moving waveform waveform image as modified by said function generator mask to provide an electrical signal output containing a waveform corresponding to said optical pattern.

References Cited

UNITED STATES PATENTS

| | | | |
|---|---|---|---|
| 2,787,188 | 4/1957 | Berger | 88—14 |
| 2,807,799 | 9/1957 | Rosenthal | 324—77 X |
| 2,820,173 | 1/1958 | Raabe. | |
| 2,936,416 | 5/1960 | Hurvitz | 324—77 |
| 3,052,843 | 9/1962 | Hurvitz | 324—77 |
| 3,055,258 | 9/1962 | Hurvitz | 324—77 X |
| 2,064,289 | 12/1936 | Cady | 88—61 X |
| 2,377,242 | 5/1945 | Kent | 332—3 |
| 2,418,964 | 4/1947 | Arenberg | 324—77 X |
| 2,451,465 | 10/1948 | Barney | 250—237 X |
| 2,465,500 | 3/1949 | Wallace. | |
| 2,476,349 | 7/1949 | Beard | 332—3 |
| 2,560,818 | 7/1951 | Pierce | 88—65 X |
| 2,622,470 | 12/1952 | Rines | 88—65 X |
| 2,623,942 | 12/1952 | Schlesinger | 88—61 X |
| 2,643,286 | 6/1953 | Hurvitz | 324—77 |
| 2,664,243 | 12/1953 | Hurvitz | 235—181 |

RUDOLPH V. ROLINEC, Primary Examiner

P. F. WILLE, Assistant Examiner

U.S. Cl. X.R.

235—181; 332—3; 343—17